United States Patent
Lemaire et al.

(10) Patent No.: US 7,866,767 B2
(45) Date of Patent: Jan. 11, 2011

(54) TRACTION BAND

(75) Inventors: Marc-André Lemaire, Drummondville (CA); Claude Faucher, Drummondville (CA); Yves St-Pierre, Wickham (CA)

(73) Assignee: Soucy International Inc., Drummondville, QC (CA)

( * ) Notice: Subject to any disclaimer, the term of this patent is extended or adjusted under 35 U.S.C. 154(b) by 61 days.

(21) Appl. No.: 12/332,991

(22) Filed: Dec. 11, 2008

(65) Prior Publication Data
US 2010/0148574 A1  Jun. 17, 2010

(51) Int. Cl.
*B60B 15/00* (2006.01)
(52) U.S. Cl. .................. 305/178; 305/165; 305/157
(58) Field of Classification Search .......... 305/165–179
See application file for complete search history.

(56) References Cited

U.S. PATENT DOCUMENTS

| | | | |
|---|---|---|---|
| 3,361,488 A | 1/1968 | Ohm | |
| 3,688,858 A | 9/1972 | Jespersen | |
| 3,734,577 A | 5/1973 | Snellman | |
| 3,955,855 A | 5/1976 | Massieon et al. | |
| 5,005,921 A | 4/1991 | Edwards et al. | |
| 5,632,537 A | 5/1997 | Yoshimura et al. | |
| 5,709,440 A * | 1/1998 | Lecours | 305/178 |
| 6,241,327 B1 | 6/2001 | Gleasman et al. | |
| 6,402,268 B1 * | 6/2002 | Lussier | 305/165 |
| 6,510,913 B1 | 1/2003 | Morin et al. | |
| 7,300,119 B2 * | 11/2007 | Ueno | 305/165 |
| 2003/0111903 A1 | 6/2003 | Katayama et al. | |
| 2005/0035655 A1 | 2/2005 | Beckstrom et al. | |
| 2006/0284484 A1 | 12/2006 | Gleasman | |
| 2008/0203813 A1 * | 8/2008 | Doyle | 305/165 |
| 2009/0256418 A1 * | 10/2009 | Uchida | 305/169 |

OTHER PUBLICATIONS

Written Opinion for PCT Application No. PCT/CA2009/001795.
International Search Report for PCT Application No. PCT/CA2009/001795.

* cited by examiner

*Primary Examiner*—Jason R Bellinger
(74) *Attorney, Agent, or Firm*—Brouillette & Parkers; François Cartier; Robert Brouillette

(57) ABSTRACT

A traction band substantially made from elastomeric material is disclosed. The traction band comprises a main band body divided into a plurality of sections connected together along laterally extending pitch lines. The band body has an interior wheel-engaging surface, adapted to cooperate with the various wheels of a track system, and an exterior ground-engaging surface adapted to engage the ground. The wheel-engaging surface comprises one or more rows of longitudinally spaced-apart drive lugs and/or guide lugs typically disposed on each of the band sections. The ground-engaging surface comprises traction lugs extending longitudinally across more than one band section, these traction lugs comprising laterally extending bending regions where the traction lugs are thinner. These bending regions are substantially aligned with regions on the interior surface which are devoid of drive lugs and guide lugs.

21 Claims, 6 Drawing Sheets

TRACTION BAND

CROSS-REFERENCE TO RELATED APPLICATIONS

There are no cross-related applications.

FIELD OF THE INVENTION

The present invention generally relates to traction bands and endless tracks for use on tracked vehicles. More particularly, but not exclusively, the present invention relates to traction bands and endless tracks for use on agricultural, construction and forestry vehicles and other similar tracked vehicles.

BACKGROUND OF THE INVENTION

Numerous types of vehicles are frequently used on terrain on which it is difficult for pneumatic tires to operate. Both military vehicles, such as tanks and armored personal vehicles, and civilian vehicles, such as tractors and recreational vehicles, are operated on terrains, such as sand surfaces, which are very soft. Pneumatic tires are generally incapable of efficient operation on such soft surfaces as they tend to burrow into the surface rather than riding across the surface.

Tracked vehicles have been developed for use on terrains on which wheeled vehicles are impractical. See for example U.S. Pat. Nos. 3,361,488; 3,688,858; 3,734,577; and 3,955,855. On many types of terrains, these vehicles provide improved performance relative to the performance of wheeled vehicles. Still, difficulties are encountered with existing tracked vehicles.

Originally, tracked vehicles were provided with tracks made of a plurality of metallic links or shoes pivotally attached to each other to form an endless track.

With the development of elastomeric traction bands and endless tracks, numerous exterior tread patterns adapted to be used on various types of terrain have been designed. For instance, some tread patterns of certain tracks have a large ground contacting surface which is more adapted to be used on hard surfaces such as asphalt and concrete, but which provides less traction on soft surfaces such as soil and sand. Tread patterns adapted to be used on soft surfaces have also been developed, but they generally do not have a very good durability on hard surfaces.

On agricultural vehicles and other tracked farming vehicles such as tractors, one type of tread pattern is commonly used and generally corresponds to the chevron pattern. This particular tread pattern generally gives an adequate traction on most terrains, which is very important for agricultural vehicles. However, due to the configuration of the chevrons, conventional chevron tread patterns typically suffer from requiring more energy to bend the track thereby increasing rolling resistance and ultimately, fuel consumption.

There have been attempts to reduce the energy required to bend endless tracks having generally chevron tread pattern. In U.S. Pat. No. 6,241,327, the traction lugs forming the chevron pattern are provided with cuts which open during bending of the track. However, these cuts significantly reduce the structural integrity of the traction lugs and thus of the track and ultimately produce only limited results. In U.S. Pat. No. 6,510,913, the chevron tread pattern is formed by several independent traction lugs. By dividing the chevron pattern into several traction lugs, the contact surface of the traction lugs is generally reduced, thereby increasing the level of vibration.

Hence, there is a need for an improved traction band which mitigates the shortcomings of prior art traction bands.

SUMMARY OF THE INVENTION

The present invention mitigates the shortcomings of the prior art by generally providing an improved elastomeric traction band. The traction band typically comprises a main band body divided into a plurality of band sections attached together (usually unitarily) along laterally extending pitch lines, the longitudinal extent of each band section being generally referred as pitch. The band body has an interior wheel-engaging surface, adapted to cooperate with the various wheels (e.g. sprocket wheel, idler wheel(s) and/or road wheel (s)) of the track system onto which the traction band is mounted, and an external ground-engaging surface adapted to engage the ground.

The wheel-engaging surface comprises one or more rows of longitudinally spaced-apart drive lugs (and/or guide lugs) disposed along the length of the band, typically on each band section. Consecutive drive lugs (and/or guide lugs) being separated by laterally extending regions devoid of drive lugs (and guide lugs) which are substantially aligned with the pitch lines.

The ground-engaging surface comprises traction lugs, some of which are extending longitudinally across more than one band section. These longitudinally extending traction lugs advantageously comprise laterally extending bending regions where the traction lugs are thinner. These bending regions are generally aligned with the pitch lines and thus, with the regions on the inner surface which are devoid of drive lugs (and guide lugs).

Preferably, the thickness of the bending regions is a fraction of the thickness of the traction lugs.

Preferably, but not exclusively, the traction lugs substantially define a chevron-like or modified-chevron tread pattern.

The skilled addressee will readily understand that the alignment of the thinner bending regions with the regions which are devoid of drive lugs (and guide lugs) on the inner surface reduces the energy required to bend or flex the traction band around the various wheels of the track system. Consequently, the traction band of the present invention reduces rolling resistance and thereby fuel consumption.

In addition, the thinner bending regions, as opposed to the prior art complete partition of the traction lugs, maintain substantial continuity and structural integrity of the tractions lugs, thereby preserving the particular advantages of the traction lugs (e.g. soil and debris evacuation, traction, etc.).

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel traction band will be described hereinafter. Although the invention is described in terms of specific illustrative embodiments, it is to be understood that the embodiments described herein are by way of example only and that the scope of the invention is not intended to be limited thereby.

Figure 1:
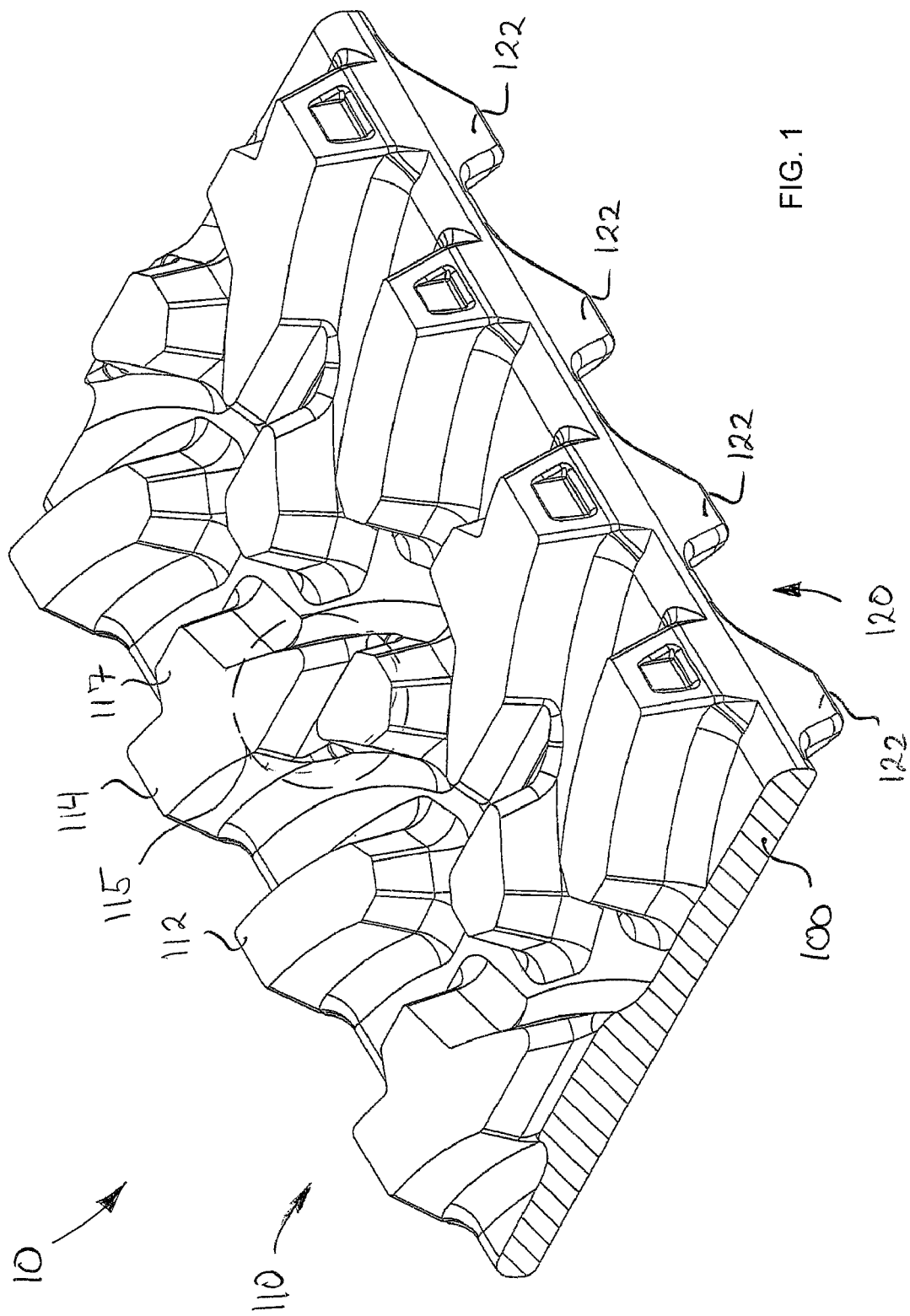
FIG. 1 is a top perspective view of a portion of a traction band incorporating the principles of the invention.
Figure 2:
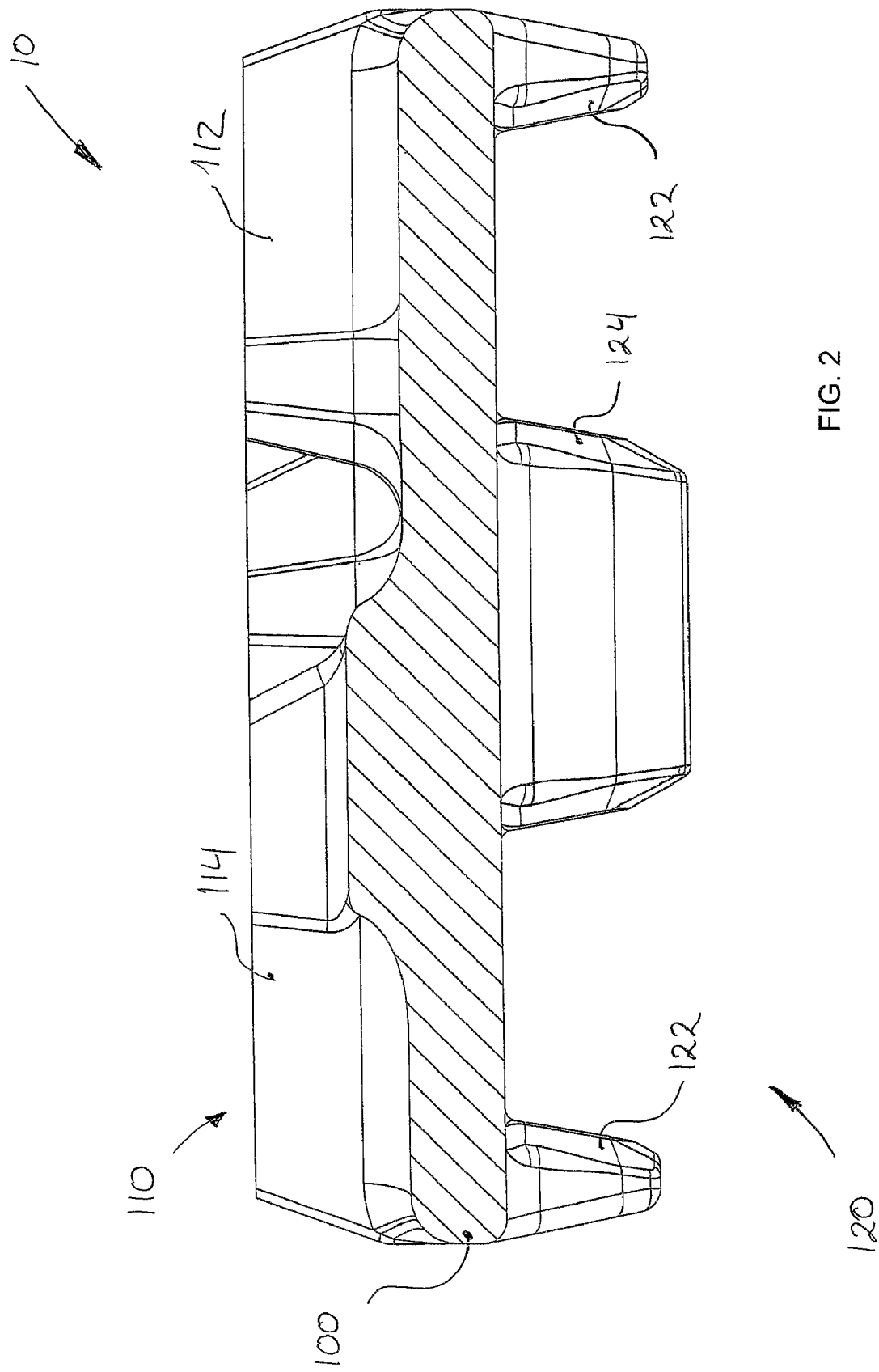
FIG. 2 is a front view of the traction band shown in FIG. 1.
Figure 6:
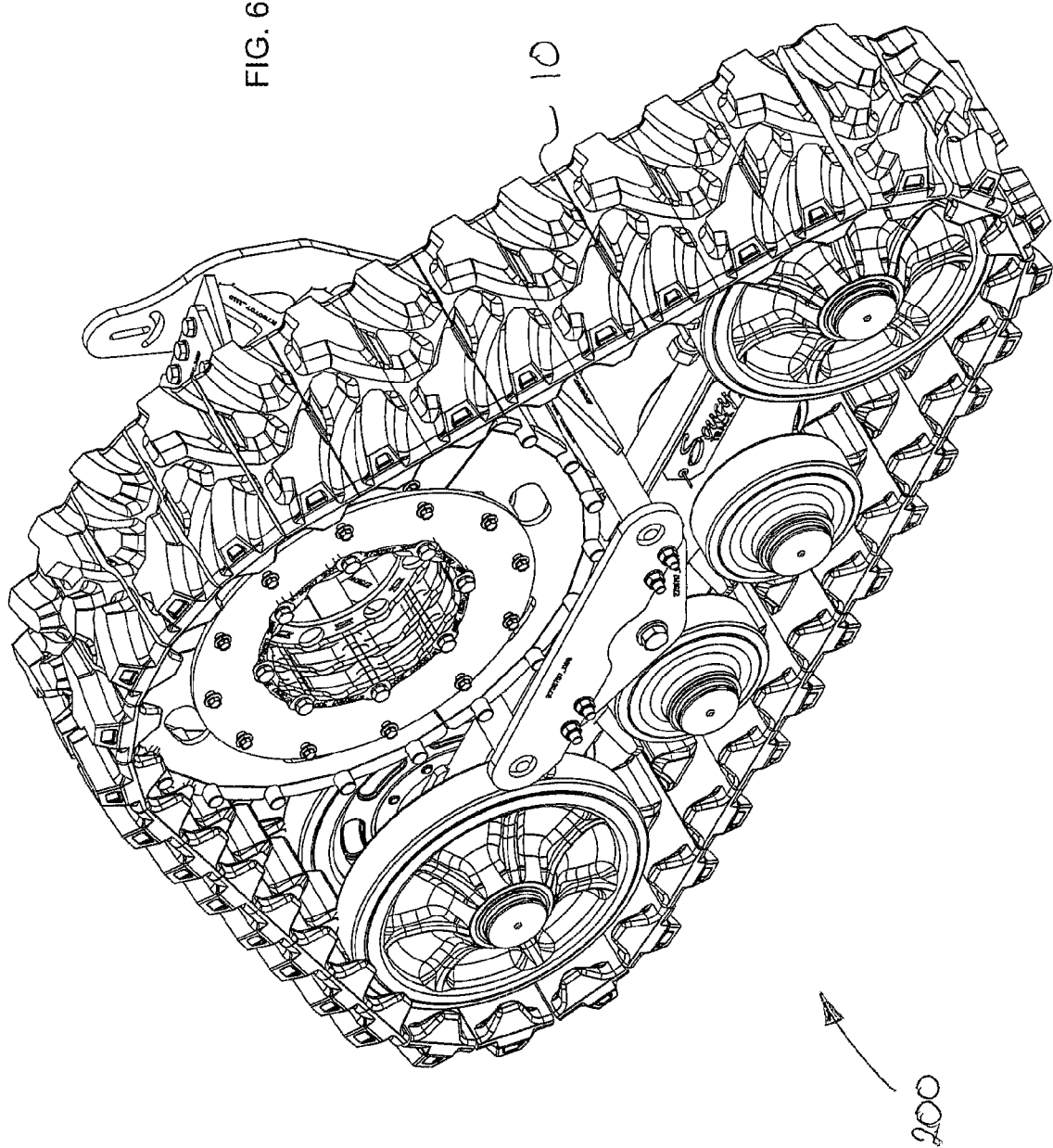
FIG. 6 is a side perspective view of a track system comprising a traction band incorporating the principles of the invention.

Referring first to FIGS. 1 and 2, an exemplary traction band 10 incorporating the principles of the invention is illustrated. The traction band 10 is generally adapted to be used with a track system such as the track system 200 shown in FIG. 6. Track systems such as track system 200 are generally known in the art and need not be further described.

The traction band 10 typically comprises a main band body 100 divided into a plurality of band sections 105 (FIGS. 3-5) attached together, usually unitarily, along laterally extending pitch lines 106. The band body 100, preferably made from reinforced elastomeric material, has an external or outer ground-engaging surface 110 and an internal or inner wheel-engaging surface 120.

The outer surface 110 is typically provided with a series of outer or ground-engaging traction lugs 112 and 114 disposed longitudinally along the outer circumference of the traction band 10. Typically, the traction lugs 112 and 114 are disposed such as to define a tread pattern. In the present preferred embodiment, the tread pattern generally follows a modified-chevron pattern or more specifically a split-chevron pattern. Still, other tread patterns are possible; the present invention is thus not so limited.

For its part, the inner surface 120 is typically, but not necessarily, provided with one or more rows of inner lugs such as drive lugs 124, adapted to cooperate with a sprocket wheel, and guide lugs 122, adapted to guide the traction band 10 around the sprocket wheel, the idler wheels and the road wheels. The guide lugs 122 and the drive lugs 124 are normally longitudinally disposed along the inner circumference of the traction band 10.

Figure 3:
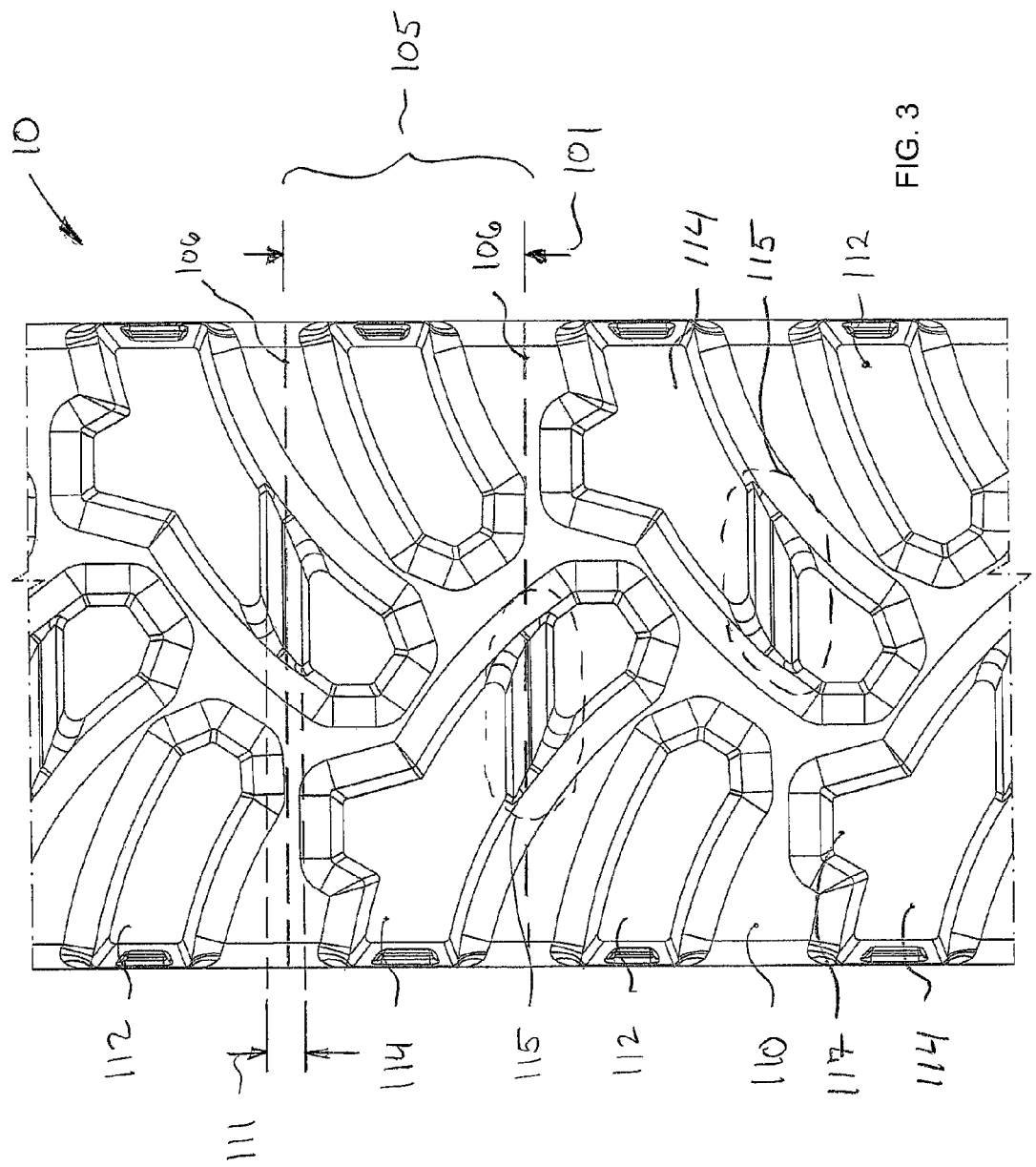
FIG. 3 is a top view of the traction band shown in FIG. 1.
Figure 4:
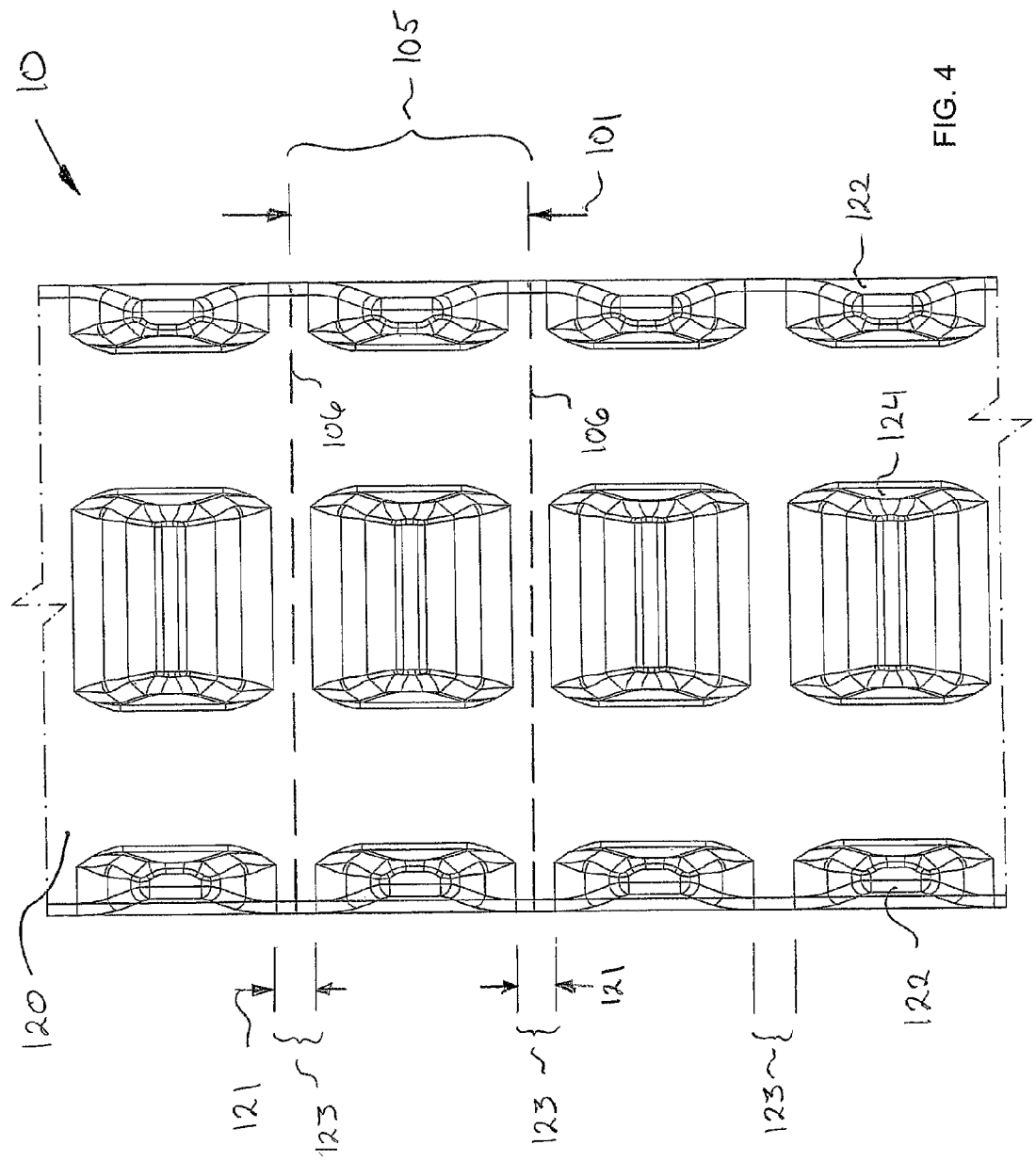
FIG. 4 is a bottom view of the traction band shown in FIG. 1.
Figure 5:
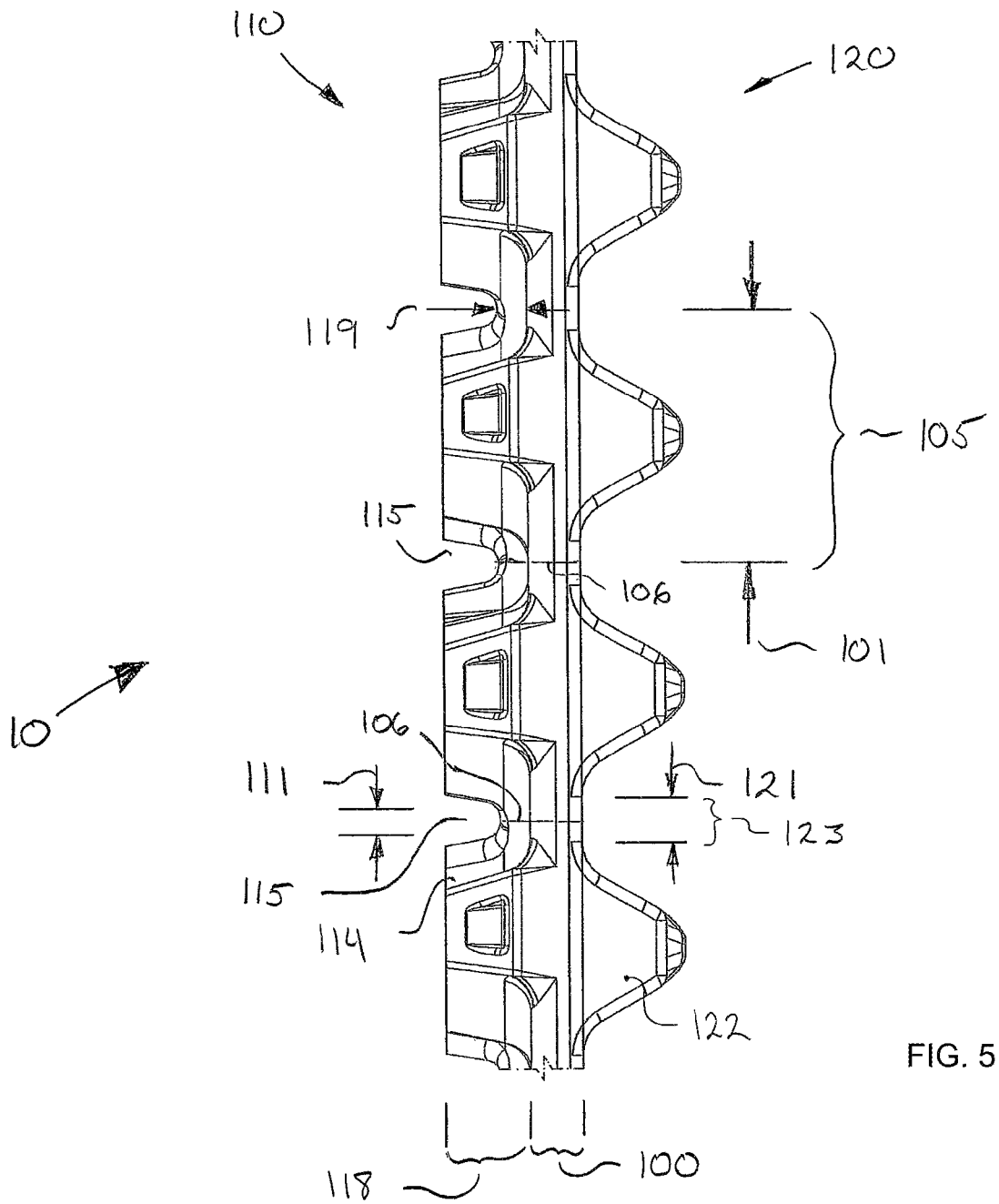
FIG. 5 is a side view of the traction band shown in FIG. 1.

Referring now to FIGS. 3 to 5 and more particularly to FIG. 4, the drive lugs 124 and guide lugs 122 are generally regularly disposed on each band section 105 along the inner circumference of the track 10. Typically, when more than one row of drive lugs 124 or guide lugs 122 are present, the drive lugs 124 and/or the guide lugs 122 are laterally aligned on each band section 105 as best depicted in FIG. 4.

In order to allow bending of the traction band 10 around the various wheels of the track system onto which the traction band 10 is installed, the guide lugs 122 and the drive lugs 124 are generally longitudinally spaced apart whereby consecutive guide lugs 122 or drive lugs 124 are separated by laterally extending regions 123 devoid of guide and drive lugs. Preferably, these hinge regions 123 are substantially aligned with the pitch lines 106 as depicted in FIG. 4.

Referring now to FIGS. 3 and 5, the outer surface 110 of the traction band 10 is illustrated in more details. As mentioned above, the outer surface 110 is provided with tractions lugs 112 and 114 which, in the present embodiment, define a modified-chevron tread pattern. As the skilled addressee will note, traction lugs 114 extend in the longitudinal direction across more than one band section 105. By extending across more than one band section 105, the traction lugs 114 effectively extend over the pitch lines 106 and thus over the lugless hinge regions 123 of the inner surface 120.

In accordance with the principles of the present invention, in order to generally ease the bending of the traction band 10 along these hinge regions 123 and in order to generally reduce the tension in the traction lugs 114, the traction lugs 114 are provided with laterally extending bending regions 115. These bending regions 115 are regions of the traction lugs 114 where the thickness 118 of the lugs 114 is reduced.

Typically, the thickness 119 along the bending regions 115 is a fraction of the thickness 118 of the traction lugs 114. Generally, the ratio between the thickness 119 of the bending region 115 and the thickness 118 of the traction lugs 114 is between 0 and 0.75. Preferably, the ratio is between 0 and 0.5, and most preferably between 0 and 0.35.

In addition, as best shown in FIG. 5, the bending regions 115 are substantially aligned with the pitch lines 106 and thus with the hinge regions 123. Also, the width 111 of the bending regions 115 is preferably similar to the width 121 of the hinge regions 123.

By providing the traction lugs 114 with these thinner bending regions 115, the overall thickness of the traction band 10 along the hinge regions 123 is reduced, thereby reducing the energy required to actually bend the traction band 10 around the various wheels of the track system. This reduces the rolling resistance and thereby the fuel consumption of the tracked vehicle.

In addition, the skilled addressee will note that by not reducing the thickness 119 of the bending regions 115 to zero (i.e. no lug), as in the prior art (see particularly U.S. Pat. No. 6,241,327), the thinner bending regions 115 maintain substantial continuity and structural integrity of the tractions lugs 114 and ultimately of the track 10. Consequently, the traction lugs 114 substantially maintain their ground-engaging characteristics (e.g. contact surface, traction, soil and debris evacuation, etc.). Moreover, aesthetically, the tread pattern is substantially preserved.

Referring back to FIGS. 1 and 3, traction lugs 114 are also preferably provided with extensions 117. Extensions 117 typically provide additional contact surface between the traction band 10 and the ground, particularly on hard surfaces such as asphalt and concrete. As the skilled addressee would understand, the extensions 117 can take several shapes and more than one extension 117 could be provided on traction lugs 114. In addition, traction lugs 112 could also benefit from having such extensions 117.

The skilled addressee will understand that a traction band 10 incorporating the principles of the present invention can advantageously be used on different types of track systems (e.g. track system 200) and/or on different types of tracked vehicles known in the art (e.g. agricultural vehicles, forestry vehicles, construction vehicles, military vehicles, etc.).

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction band comprising a band body divided into a plurality of sections along laterally extending pitch lines, said body having an inner wheel-engaging surface and an outer ground-engaging surface, said inner surface comprising drive and/or guide lugs wherein consecutive drive and/or guide lugs are separated by regions extending along said pitch line and devoid of said drive and/or guide lugs, said outer surface comprising traction lugs, wherein several of said traction lugs extend longitudinally across more than one of said sections, each of said several traction lugs having a first thickness and comprising at least one thinner region having a second thickness larger than zero but smaller than said first thickness, and extending along one of said pitch lines such as to be substantially aligned with one of said regions devoid of said drive and/or guide lugs.

2. A traction band as claimed in claim 1, wherein said regions devoid of said drive and/or guide lugs have a first width and said thinner regions have a second width, and wherein said second width is equal to or smaller than said first width.

3. A traction band as claimed in claim 1, wherein a ratio of said second thickness to said first thickness is greater than zero and lower or equal to 0.75.

4. A traction band as claimed in claim 1, wherein a ratio of said second thickness to said first thickness is greater than zero and lower or equal to 0.50.

5. A traction band as claimed in claim 1, wherein a ratio of said second thickness to said first thickness is greater than zero and lower or equal to 0.35.

6. A traction band as claimed in claim 1, wherein said traction band is substantially made from elastomeric material.

7. A traction band as claimed in claim 1, wherein said band body is unitary.

8. A traction band as claimed in claim 1, wherein said traction lugs define a chevron-like pattern.

9. A track system comprising a frame, a sprocket wheel and a traction band as claimed in claim 1.

10. A tracked vehicle having mounted thereto a traction band as claimed in claim 1.

11. A traction band comprising a band body divided into a plurality of band sections along laterally extending pitch lines, said body having an inner surface and an outer surface, said inner surface comprising inner lugs disposed longitudinally on said band sections, consecutive inner lugs being separated by laterally extending regions substantially aligned with said pitch lines and devoid of said inner lugs, said outer surface comprising outer lugs, several of said outer lugs extending longitudinally across more than one of said band sections, said several outer lugs having a first thickness and comprising thinner regions having a second thickness larger than zero and smaller than said first thickness and extending in substantial alignment with said pitch lines such as to be in substantial alignment with said regions devoid of said inner lugs.

12. A traction band as claimed in claim 11, wherein said regions devoid of said inner lugs have a first width and said thinner regions have a second width, and wherein said second width is equal to or smaller than said first width.

13. A traction band as claimed in claim 11, wherein a ratio of said second thickness to said first thickness is greater than zero and lower or equal to 0.75.

14. A traction band as claimed in claim 11, wherein a ratio of said second thickness to said first thickness is greater than zero and lower or equal to 0.50.

15. A traction band as claimed in claim 11, wherein a ratio of said second thickness to said first thickness is greater than zero and lower or equal to 0.35.

16. A traction band comprising a band body divided along laterally extending pitch lines, said band body having an inner surface and an outer surface, said inner surface comprising one or more rows of longitudinally aligned and spaced-apart inner lugs, consecutive inner lugs being separated by lug-less regions substantially aligned with said pitch lines, said outer surface comprising outer lugs, several of said outer lugs having a first thickness and comprising thinner regions having a second thickness larger than zero and smaller than said first thickness and being substantially aligned with said pitch lines such as to be substantially aligned with said lug-less regions.

17. A traction band as claimed in claim 16, wherein said lug-less regions have a first width and said thinner regions have a second width, and wherein said second width is equal to or smaller than said first width.

18. A traction band as claimed in claim 16, wherein a ratio of said second thickness to said first thickness is greater than zero and lower or equal to 0.75.

19. A traction band as claimed in claim 16, wherein a ratio of said second thickness to said first thickness is greater than zero and lower or equal to 0.50.

20. A traction band as claimed in claim 16, wherein a ratio of said second thickness to said first thickness is greater than zero and lower or equal to 0.35.

21. A traction band comprising a band body divided into a plurality of sections along laterally extending pitch lines, said body having an inner wheel-engaging surface and an outer ground-engaging surface, said inner surface comprising drive and/or guide lugs wherein consecutive drive and/or guide lugs are separated by regions extending along said pitch line and devoid of said drive and/or guide lugs, said outer surface comprising traction lugs, wherein several of said traction lugs overlap more than one of said sections, said several traction lugs having a first thickness and a plurality of said several traction lugs comprising at least one thinner region having a second thickness larger than zero but smaller than said first thickness, and extending along one of said pitch lines such as to be substantially aligned with one of said regions devoid of said drive and/or guide lugs.

* * * * *